Dec. 8, 1931.  A. M. ROSSMAN  1,835,339
ANGULAR PIPE CLAMP FITTINGS
Filed Oct. 25, 1926    3 Sheets-Sheet 3

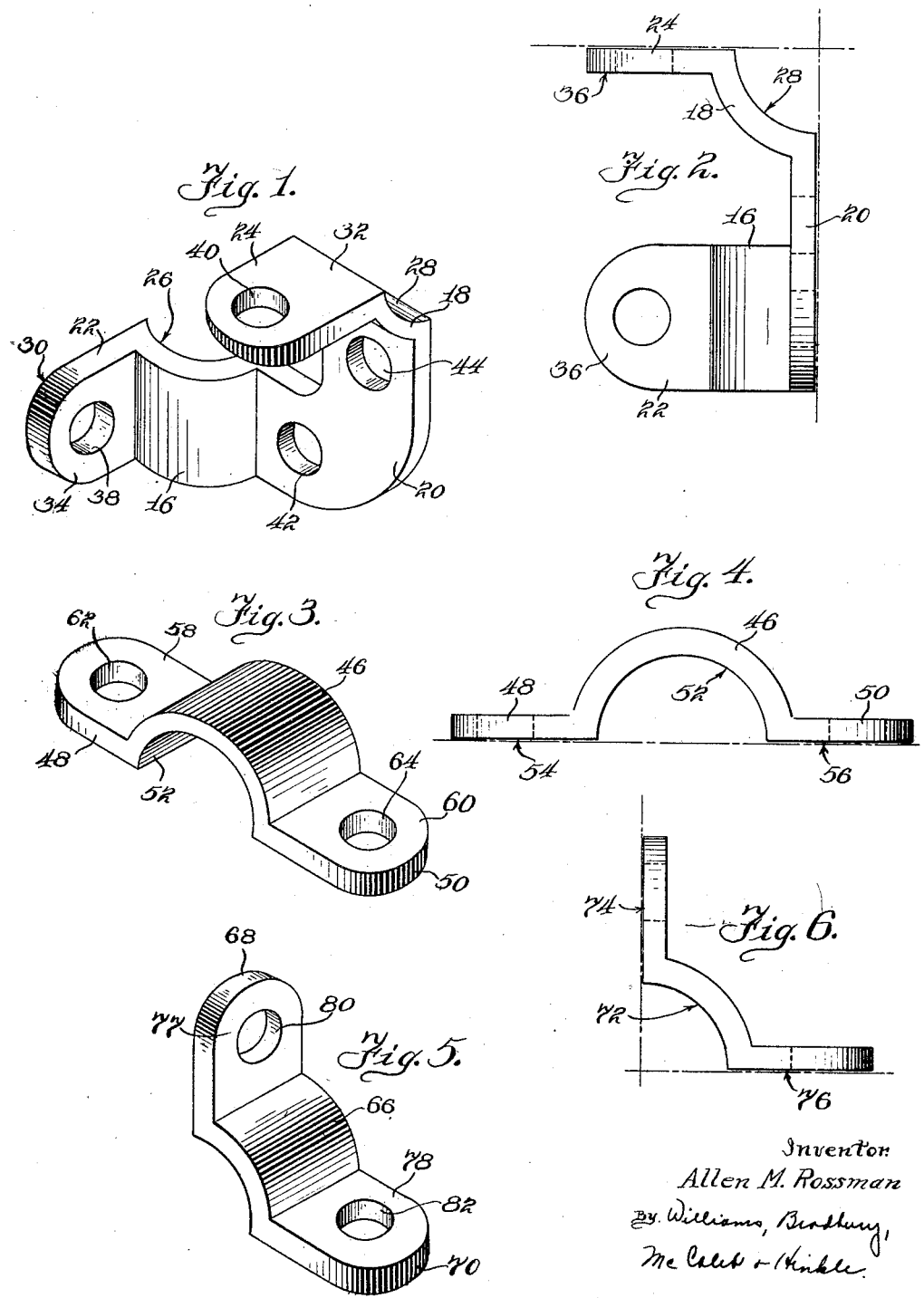

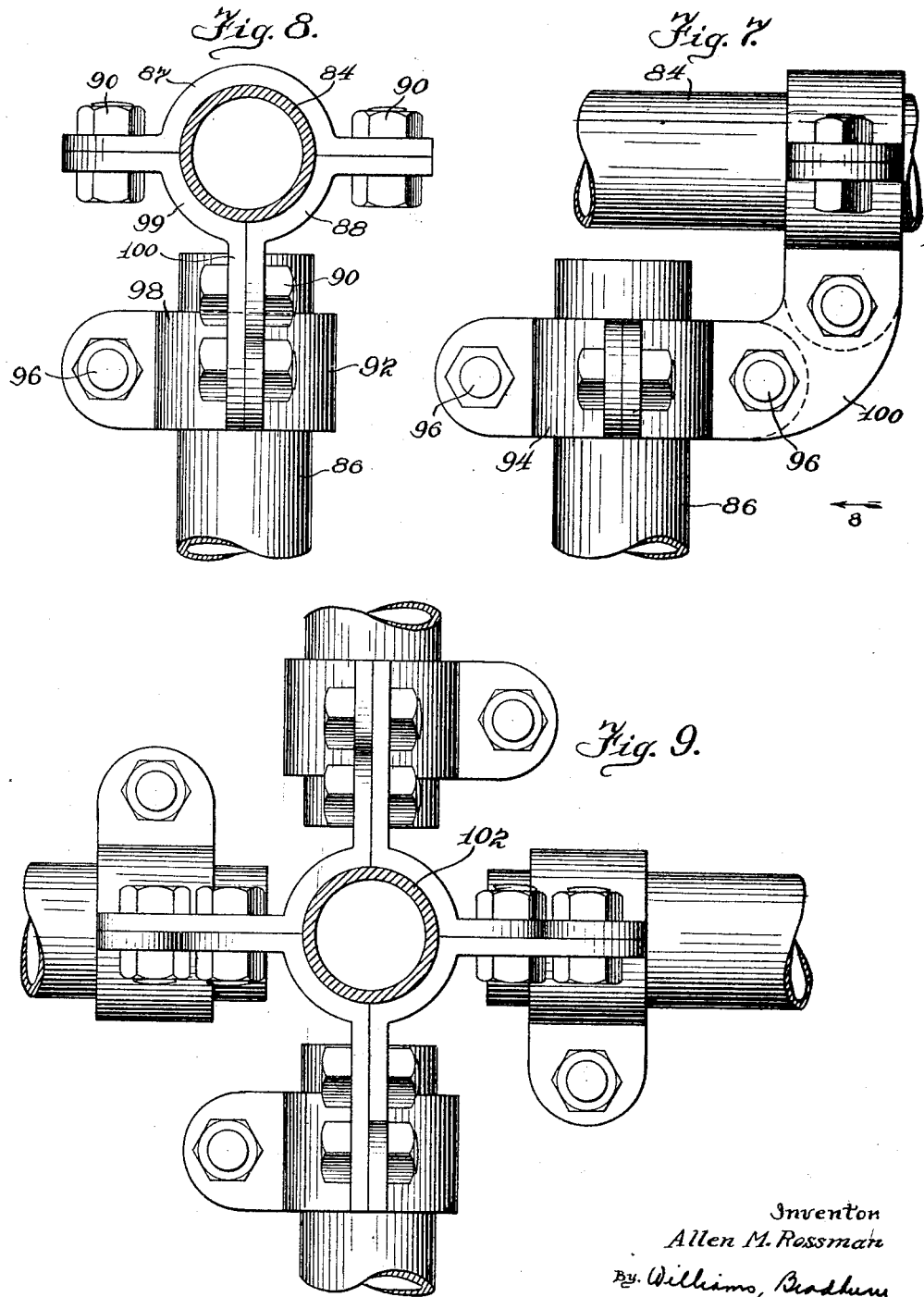

Inventor
Allen M. Rossman
By Williams, Bradbury,
McCaleb & Hinkle
Attorneys.

Patented Dec. 8, 1931

1,835,339

UNITED STATES PATENT OFFICE

ALLEN M. ROSSMAN, OF CHICAGO, ILLINOIS, ASSIGNOR, BY MESNE ASSIGNMENTS, TO ROSSMAN PATENTS, INCORPORATED, OF CHICAGO, ILLINOIS, A CORPORATION OF ILLINOIS

ANGULAR PIPE CLAMP FITTINGS

Application filed October 25, 1926. Serial No. 143,876.

My invention relates to clamps.

It will be explained as embodied in a clamp particularly adapted to hold cylindrical rods or pipes together in various arrangements and combinations.

In the erection of many kinds of structures, such, for example, as switch boards, panel boards, scaffolds and open metal towers and frame works for supporting walls, machinery and appliances, it is a common practice to use cylindrical metal rods or pipe which are clamped together in such a manner as to produce the desired structure and to afford the requisite strength and rigidity thereof. It is often necessary or desirable to join together a considerable number of such pipes or rods at various angles.

It is now the usual practice for manufacturers of clamps used in the fabrication of such structures to provide a large number of different types of clamps, each type being especially adapted for some particular condition, as to the number of pipes it can accommodate and as to the angle to which the pipes are joined. This practice results in inconvenience and excessive expense, both to the manufacturer and to the user. The manufacturer must produce and stock and the user must keep on hand a large variety of clamps in order that the particular device required for any situation which may arise will be available. The necessary number and variety of clamps causes confusion, loss of time, and expense.

When my new and improved clamp is used, it is only necessary to have a supply of three kinds of simple and inexpensive units and sufficient nuts and bolts to secure said units. These three kinds of units may be so assembled as to join two or more pipes lying in the same or different planes provided the axis of each pipe is perpendicular to the axis of one of the other pipes.

An object of this invention is to provide an improved clamp.

Another object is to provide a clamp which will overcome the objections to the present clamp heretofore manufactured.

Another object is to provide an improved clamp unit.

Another object is to provide clamp units which may be readily assembled in proper relation.

Another object is to provide three styles of clamp units which may be associated in a variety of ways to fabricate clamps for a wide range of use.

Another object is to provide complementary clamp units whose relation in various assemblies may readily be determined.

Another object is to provide clamp units which may be secured together in various combinations with a minimum number of bolts.

Another object is to provide clamp units which are simple, inexpensive, reliable, and strong.

Other objects and advantages will hereinafter appear.

In general, the clamp units, from which the various clamps may be fabricated, comprise angular clamp units, half clamp units and quarter clamp units. The angular clamp units are so named because such units include two angularly related body portions, one of these body portions being carried at each end of a connecting web; the entire unit being adapted to partially embrace and firmly connect two angularly related pipes. The half units are so named because two such units will, when properly assembled, form a substantially complete circular clamp section or collar. The quarter units are so named because four such units will form substantially a complete circular clamp section or collar.

Embodiments and illustrative applications of the invention are shown in the accompanying drawings, wherein Fig. 1 is a perspective of one form of angular clamp unit;

Fig. 2 is a side elevation thereof;

Fig. 3 is a perspective of a half clamp unit;

Figure 10:
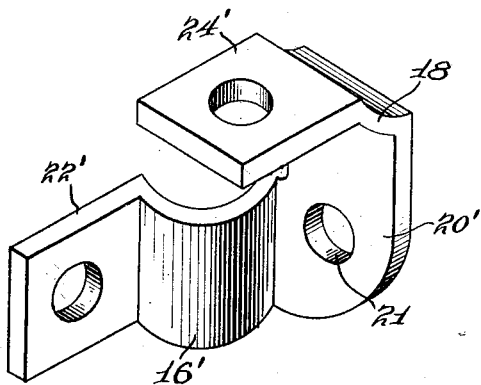
Figure 12:
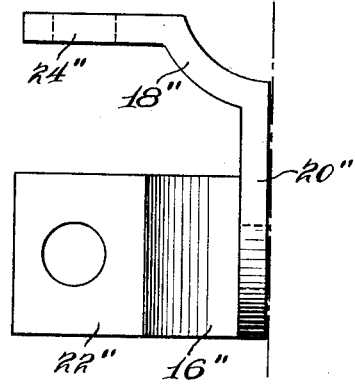
Figure 11:
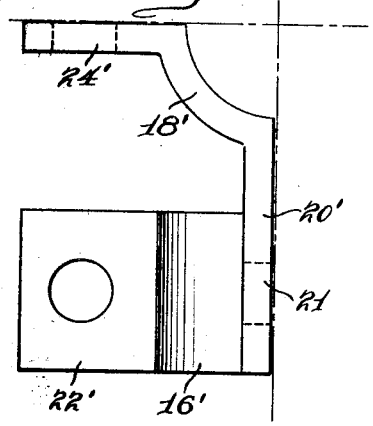
Figure 13:
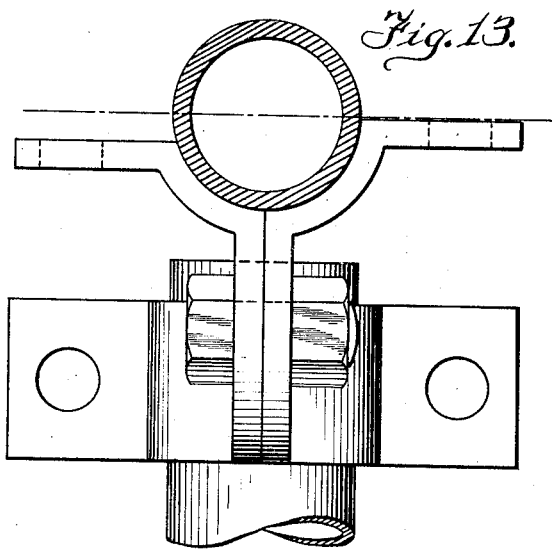

Fig. 4 the side elevation thereof;

Fig. 5 is the perspective of a quarter clamp unit;

Fig. 6 is the side elevation thereof;

Fig. 7 is a side elevation of a joint composed of my clamp units and connecting two pipes lying at right angles to each other;

Fig. 8 is another view of the joint shown in Fig. 7 looking in the direction of the arrow 8 in said figure;

Fig. 9 shows an assembly of my clamp units to form a clamp for connecting five or six pipes meeting at right angles;

Fig. 10 is a perspective of a second form of my angular clamp unit;

Fig. 11 is a side elevation thereof;

Fig. 12 is a view similar to Fig. 11 showing a still further modification of my angular clamp unit;

Fig. 13 shows the clamp units shown separately in Figs. 11 and 12 assembled in cooperating relationship to connect two pipes meeting at right angles.

The angular unit shown in Figs. 1 and 2 comprises curved body portions 16 and 18 at opposite ends of the connecting web 20 and outwardly projecting clamping lugs 22 and 24 carried respectively by body portions 16 and 18. The body portions 16 and 18 have inner or pipe clamping faces 26 and 28, respectively, which are curved on the arc of a circle having a diameter approximately the same as the external diameter of the pipe or rod with which they are to be used. Preferably, the thickness of the body portions 16 and 18, the connecting web 20 and the lugs 22 and 24 are about the same and sufficient to withstand the loads to which the units will be subjected. The lugs 22 and 24 have inner or front clamping faces 30 and 32, respectively located approximately in a plane of a radius of the adjacent body or pipe clamping face, and rear or outer clamping faces 34 and 36, respectively, substantially parallel thereto. The clamping faces 30 and 32 preferably should fall slightly short of being in a plane of a diameter of their respective curved faces 26 and 28 so that the pipe or rod will be tightly clamped when the units are assembled. About $\frac{1}{32}$ of an inch has been found to give good results under ordinary conditions. The clamping lugs and connecting web are provided with holes 38, 40, and 42 and 44, respectively, for the receipt of assembly bolts, as will hereinafter be explained.

The half unit shown in Figs. 3 and 4 comprises a curved body portion 46 and two outwardly projecting clamping lugs 48 and 50, one lug being at each end of the body 46. The body 46 has an inner or pipe clamping face 52 which is curved on the arc of a circle having a diameter approximately the same as the external diameter of the pipe or rod with which it is to be used. Preferably, the thickness of the body 46 and lugs 48 and 50 are about the same and sufficient to withstand the loads to which the units will be subjected. The lugs 48 and 50 have inner or front clamping faces 54 and 56, respectively, located approximately in a plane of a diameter of the body or pipe clamping face 52, and rear or outer clamping faces 58 and 60, respectively, substantially parallel thereto. The clamping faces 54 and 56 preferably should fall slightly short of being in a plane of a diameter of curved face 52, so that the pipe or rod will be tightly clamped when the units are assembled. About $\frac{1}{32}$ of an inch has been found to give good results under ordinary conditions. The clamping lugs 48 and 50 are provided with holes 62 and 64, respectively, for the receipt of assembly bolts, as will hereinafter be explained.

The quarter unit shown in Figs. 5 and 6 comprises a curved body 66 and two right angularly related outwardly projecting clamping lugs 68 and 70. The body 66 has an inner or pipe clamping face 72 which is curved on the arc of a circle having diameter approximately the same as the external diameter of the pipe or rod with which it is to be used. Preferably, the thickness of the body 66 and lugs 68 and 70 are about the same and sufficient to withstand the loads to which the units will be subjected. The lugs 68 and 70 have inner or front clamping faces 74 and 76, respectively, located approximately in planes of perpendicular radii of the curve of the pipe clamping face 72, preferably falling slightly short of the radii in order to insure a tight grip upon the pipe. As in the case of the previously described units, about $\frac{1}{32}$ of an inch ordinarily will produce satisfactory results. The lugs 68 and 70 have rear clamping faces 77 and 78, respectively, which are substantially parallel to their respective front clamping faces. Bolt holes 80 and 82 are provided in lugs 68 and 70, respectively, for the receipt of assembly bolts, as will hereinafter be explained.

These three types of clamp units are adapted to be assembled in various relationships to form clamps for joining together two or more pipes lying in the same or perpendicular planes, and the axes of which pipes intersect at a point common to all of said axes. It will thus be seen that these three clamp units provide for the easy fabrication of a large variety of clamps, a few typical examples of which will hereinafter be described.

Figs. 7 and 8 illustrated in detail an assembly and arrangement of units for fabricating a two-way clamp suitable for joining two pipes whose axes intersect at a right angle. These figures may be considered as illustrating the manner in which an upright or supporting pipe is joined to the horizontal or latterly extending pipe supported thereby. To form a clamp for this purpose the preferred assembly includes one angular clamp unit, two half units and two quarter units, all as illustrated in the drawing. It is to be understood, however, that two quarter units may be substituted for a half unit should such substitution be desirable. Supporting pipe 86 is embraced and firmly gripped by a collar composed of half unit 92, quarter unit 94, and the body portion 98 of the angular clamp unit 100. These units are firmly held in cooperating relationship and firmly gripping the pipe 86 by means of bolts 96. A similar collar surrounds and tightly grips the pipe 84 and comprises half unit 87, quarter unit 88, and the body portion 99 of the angular clamp unit 100. The units are held in cooperating relation and securely gripping pipe 84 by bolts 90. It will thus be seen that the connecting web of the angular clamp unit 100 constitutes the means for connecting the collar embracing and gripping pipe 84 with the similar collar embracing and gripping 86, and firmly joins these pipes together. It is to be noted that the arrangement of the half unit and quarter unit in the collar embracing the pipe 84, is different from the arrangement of these units in the collar embracing the pipe 86. Either of these arrangements may be used as desired.

Fig. 9 shows an arrangement and assembly of units to form a six-way clamp, suitable for uniting four pipes to the upright 102, or for joining six pipes if all end at the clamp. In fabricating a clamp of this type, four angular units are used to form each of two opposite sections, for example, the upper and lower sections which embrace the pipe 102. The collars or sections for surrounding and gripping the horizontal pipes are completed by half units or quarter units, as desired.

Figs. 10 and 11 show a modification of my angular clamp unit wherein the connecting web has only one bolt hole. This modification is adapted to be combined with other angular units, half units, and quarter units, to surround and join right angularly related pipes. The angular unit shown in Figs. 10 and 11 comprises a connecting web 20', curved body portions 16' and 18' carried at the ends of the web, and outwardly projecting clamping lugs 22' and 24' carried by said body portions, all of these parts being similar to the corresponding parts of the angular clamp unit shown in Figs. 1 and 2. In this form of my angular unit the connecting web 20' has only a single bolt hole 21.

The form shown in Fig. 12 is identical with that shown in Figs. 10 and 11, except that the curved body portion 18'' falls short of being a complete quarter section of a circle by approximately the thickness of a lug.

The angular units shown in Figs. 11 and 12 may be combined to connect right angularly related pipes as shown in Fig. 13. With this type of angular unit, it is necessary to place two such units back to back, as only a single bolt hole is provided in the connecting web. When these units are assembled with half units or quarter units, a gap is formed between the lug carried by the short body part of an angular unit and the corresponding lug of the cooperating quarter or half unit. This gap is substantially the thickness of a lug and permits the insertion therein of a supporting or steadying bracket or of the lug of a unit of a similar clamp assembly, thereby permitting the joining together of pipes at other than right angles.

Having thus illustrated and described several embodiments of my invention, what I claim and desire to secure by United States Letters Patent is as follows:

A clamp unit adapted to form part of a clamp for joining rod-like members and comprising a connecting web, a body portion at one end thereof, a lug carried by said body portion, a second body portion at the other end of said connecting web, said second body portion having a clamping face curved on the arc of a circle, said connecting web having a clamping face extending approximately in a plane of a radius of said curved clamping face, and a lug carried by said second body portion and having a clamping face in a plane spaced from a radius of the curved clamping face by a distance equal to the thickness of a lug.

In witness whereof, I hereunto subscribe my name this 21 day of October, 1926.

ALLEN M. ROSSMAN.